United States Patent [19]
Reed et al.

[11] Patent Number: 5,896,440
[45] Date of Patent: Apr. 20, 1999

[54] SYSTEM AND METHOD FOR PROVIDING A UNIFIED COMMUNICATIONS LINK BETWEEN DIVERGENT COMMUNICATION NETWORKS

[75] Inventors: Walter S. Reed, Temple Terrace, Fla.; Walter E. Tamminen, Jr., North Richland Hills, Tex.; Ronald D. Thornton, Maynard; Nathan M. Kohn, Arlington, both of Mass.

[73] Assignee: GTE Service Corporation, Irving, Tex.

[21] Appl. No.: 08/613,758

[22] Filed: Feb. 26, 1996

Related U.S. Application Data

[63] Continuation of application No. 08/249,489, May 26, 1994, abandoned.

[51] Int. Cl.$^6$ .............................. H04M 1/24; H04M 3/08
[52] U.S. Cl. ........................ 379/1; 379/2; 379/10; 379/15
[58] Field of Search ........................ 379/1, 2, 10, 34, 379/15, 16, 93, 94, 112, 221, 229, 230, 236, 237, 240, 241; 370/465, 466, 467

[56] References Cited

U.S. PATENT DOCUMENTS

| | | | |
|---|---|---|---|
| 4,247,740 | 1/1981 | Anderson | 379/229 |
| 4,636,584 | 1/1987 | Binkerd | 379/240 |
| 4,653,085 | 3/1987 | Chan | 379/94 |
| 4,685,127 | 8/1987 | Miller | 379/221 |
| 4,688,170 | 8/1987 | Waite | 379/93 |
| 4,817,130 | 3/1989 | Frimmel, Jr. | 379/216 |
| 4,980,906 | 12/1990 | Forson et al. | 379/2 |
| 5,140,590 | 8/1992 | Gertsman | 379/232 |
| 5,182,748 | 1/1993 | Sakata | 370/94.1 |
| 5,182,751 | 1/1993 | Bales | 370/60 |

*Primary Examiner*—Vijay Shankar
*Attorney, Agent, or Firm*—Leonard Charles Suchyta; Floyd E. Anderson

[57] ABSTRACT

A unified communication system is designed using an agreed upon transmission protocol between different carriers. The protocol is used to allow the automatic gathering of administrative data (such as trouble reports) from diverse locations within a sending network, using the proprietary administration data language and structure of that network. The gathered data is transported using the transmission principle to a single point of contact at a receiving network and translated into a data structure proprietary to the receiving network and thus presented to the proper system for action within the receiving system.

16 Claims, 6 Drawing Sheets

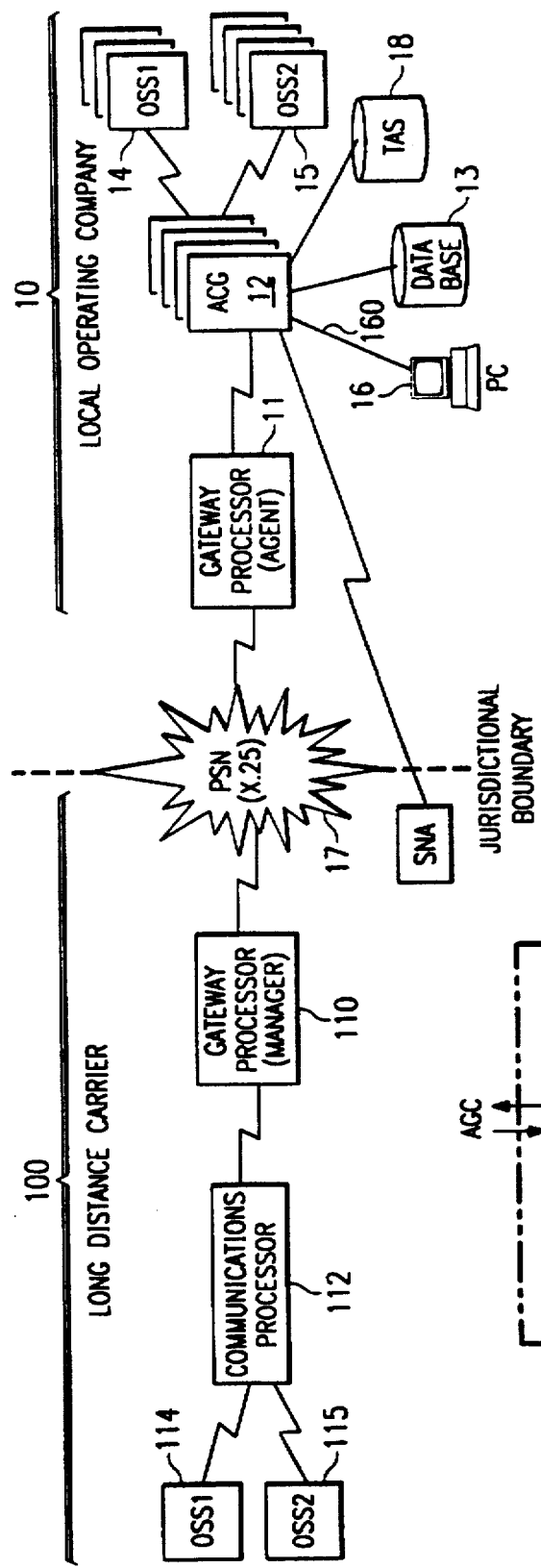
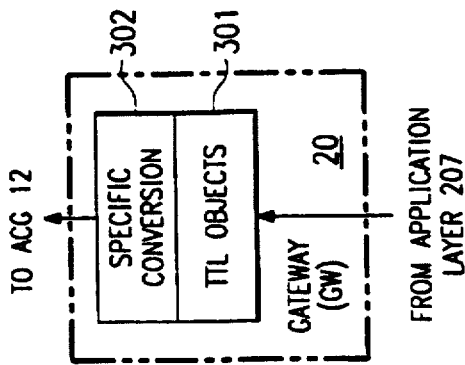
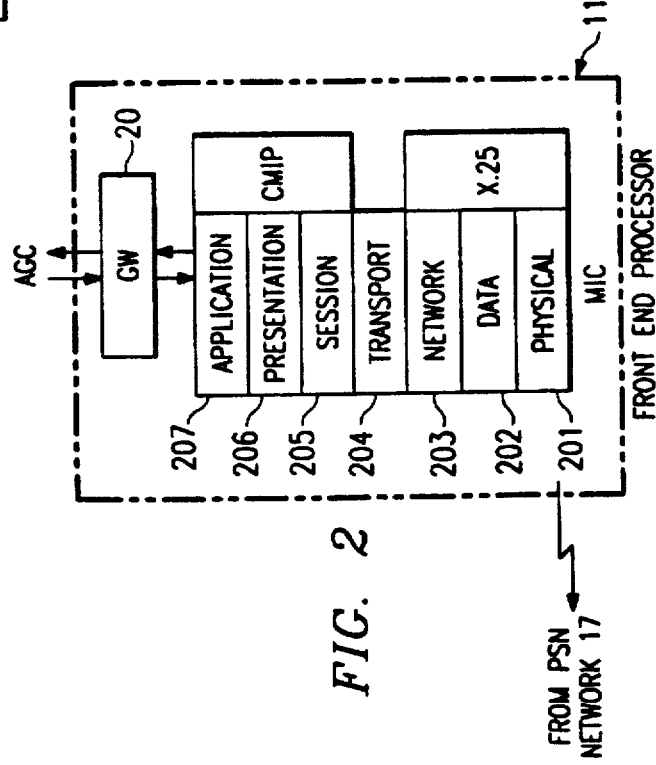

| FUNCTIONAL UNIT | CMISE SERVICES | FUNCTIONS | APPLICABLE OBJECTS |
|---|---|---|---|
| KERNAL | PT-CREATE | ENTER TROUBLE REPORT | TTR |
| | PT-GET | REQUEST TROUBLE REPORT STATUS | TTR |
| ADD TROUBLE INFORMATION | PT-SET | ADD TROUBLE INFORMATION | TTR |
| MODIFY TROUBLE ADMINISTRATION INFORMATION | PT-SET | 1. MODIFY TROUBLE REPORT ATTRIBUTES | TTR |
| TROUBLE ADMINISTRATION CONFIGURATION EVENT NOTIFICATION | PT-EVENT-REPORT | 1. TROUBLE REPORT ATTRIBUTE VALUE CHANGE<br>2. ENROLL TROUBLE REPORT<br>3. DE-ENROLL TROUBLE REPORT<br>4. ENROLL TROUBLE REPORT FORMAT DEFINITION<br>5. DE-ENROLL TROUBLE REPORT FORMAT DEFINITION<br>6. TRFD - ATTRIBUTE VALUE CHANGE | TTR<br><br><br>TRFD<br><br>EFD |
| TROUBLE REPORT STATUS AND COMMITMENT TIME UPDATE NOTIFICATION | PT-EVENT-REPORT | TROUBLE REPORT ATTRIBUTE VALUE CHANGE FOR TROUBLE REPORT STATUS AND/OR COMMITMENT TIME. | TTR<br>EFD |
| VERIFY TROUBLE REPAIR COMPLETION | PT-SET | VERIFY REPAIR COMPLETION | TTR |
| CANCEL TROUBLE REPORT | PT-SET | CANCEL TROUBLE REPORT | TTR |
| TROUBLE REPORT PROGRESS NOTIFICATION | PT-EVENT-REPORT | TROUBLE REPORT PROGRESS UPDATE | TTR<br>EFD |
| REQUEST TROUBLE REPORT FORMAT | PT-GET | REQUEST TROUBLE REPORT FORMAT | TRFD<br>CNM-SERVICE |
| TROUBLE HISTORY EVENT NOTIFICATION | PT-EVENT-REPORT | TROUBLE HISTORY EVENT NOTIFICATION | TTR<br>EFD |
| REVIEW TROUBLE HISTORY RECORD | PT-GET | REVIEW TROUBLE HISTORY | LOG<br>THR |
| EXTENDED MODIFY | PT-SET | MODIFY TROUBLE REPORT ATTRIBUTE | TTR |

*FIG. 4*

*CAN BE ENTERED FROM OTHER STATES DUE TO LOCAL CONDITIONS

SYSTEM AND METHOD FOR PROVIDING A
UNIFIED COMMUNICATIONS LINK
BETWEEN DIVERGENT COMMUNICATION
NETWORKS

This application is a continuation of application Ser. No. 08/249,489 filed on May 26, 1994 now abandoned.

TECHNICAL FIELD OF THE INVENTION

This invention relates to telecommunication systems and more specifically to a system and method for allowing diverse telecommunication networks to communicate with each other over a unified communication link.

BACKGROUND OF THE INVENTION

The current problem stems from the fact that telecommunications to a particular user is fragmented between companies, each having a different jurisdictional function. Thus, a local telephone operating company (or local exchange carrier or local carrier), such as GTE, is connected to the actual end user and provides local telecommunications services. The end user, however, has a choice of long distance telecommunication carriers (or interexchange carriers), such as AT&T. Typically, it is the local operating company who has responsibility for providing the communication circuits to the end user and who must maintain those circuits in proper working order. In order to accomplish this function the local operating company receives from the long distance carriers information pertaining to troubles (or other situations) relating to various end user equipment.

Presently, because of Regulatory Constraints, this communication between networks is handled across jurisdictional boundaries by a telephone call. Thus, the company believing a problem to exist with equipment of another company first attempts to identify the geographical area of the country where the problem exists. A record is made of the trouble at the sending company. A telephone call is then placed to an operator at the troubled company and the identified problem, including the circuit identification, is voice communicated to the receiving operator. The receiving operator then keys the received information into the system for local processing.

At best, the above-described present procedure is slow and costly. At worst, there are at least two points where information can be lost or miskeyed since two different people are entering the same information into different networks. If the miskeyed information is, for example, the address of the end user, then a service call is made to the wrong address, again a waste of resources, with the result that time is lost in restoring telecommunications services.

The problem is compounded by several factors. First, within the local operating company there are several different centers for trouble control and for administration of circuits in general. Thus, while a trouble report may be handled in one center in one part of the country, a billing or collection problem will be handled from a different, geographically remote, center. A service restoral or added customer equipment request may be handled from a third geographically remote site. This is even further compounded in that the same type of situation, i.e., a trouble condition, could be handled from several different locations.

A second level of problem comes from the fact that a long distance carrier also may gather its trouble reports or other data from different centers spaced at different locations. Thus different operators can become involved in making the trouble reports.

A third level of complexity is added when it is understood that all such administrative data pertaining to trouble reports, billing and collection, equipment changes, etc., must be communicated in a tower of babel world where complex support networks are designed and maintained by different companies, and where the administrative networks of each company are organized according to individual requirements which are not uniform from company to company. Thus, the internal data communications between the various parts of each network are different and perhaps even proprietary in nature for each company.

In addition to having different data structures, the various companies each have different forms for the information, and often different names for the same pieces of information. Accordingly, sending administrative data, such as trouble reports, between jurisdictional carriers on an automatic basis is not currently practical. It is also not very practical to have all of the carriers modify their report structures or languages to achieve compatibility. The cost and logistics make such an approach out of the question.

Thus, it is one object of this invention to provide a system and method for communicating administrative data between diverse communication systems where each such communication system contains its own internal protocols, automatically without requiring any system to change its internal protocols.

It is a further object of this invention to provide a system and method which will allow a sending communication system to gather packages of administrative data having a first protocol and to deliver that data over a switched or dedicated network to a receiving communication system having a second protocol.

It is a still further object of this invention to provide such a system and method where the receiving system can process the administrative data from the sending system and return timely responses pertaining to the status of the inquiry contained within the administrative data.

It is a still further object of this invention to provide a system and method at a service providing telecommunication system operated by a first company for receiving administrative data from a second service providing company wherein the administrative data pertains to circuitry provided by the first company for use by the second company and wherein the protocols for internally handling such administrative data are different for each company and wherein the provided system and method preserves the internal protocols of each such company's system.

SUMMARY OF THE INVENTION

We have solved these problems by arranging a system and method such that, instead of a phone call being made from a sending communication network to a point within the receiving communication network selected by the sending network, the administrative data are electronically and automatically communicated through a single gateway. The gateway on the sending network side gathers administrative data from a plurality of points within the sending network and packages the gathered data into an agreed-upon, object oriented transmission protocol. This repackaged transmission protocol is then transported over the existing switching network to a single gateway within the receiving network. The receiving gateway then operates on the protocol and extracts messages for delivery to various points within the receiving network.

The actual physical location of the final delivery points of the data messages contained within the transmission protocol is transparent to the sending network. In this manner the respective internal administrative data protocols of each network are maintained. In addition, all of the administrative data can flow between two pre-identified gateways, one on each side of the switched or dedicated thus allowing a single, if desired, telecommunication link to be established between the gateways. This link can be maintained for a period of time, allowing several exchanges of protocol converted data. The link also can be temporary to handle one or a few protocol exchanges at a time.

In one embodiment, the administrative data are in the form of a trouble report from a long distance carrier to a local telecommunication provider. In such a system, the long distance company would gather its trouble reports from all across its service area (which could be worldwide) in whatever internal protocol it has adopted. These trouble reports will have a language and structure unique to that long distance carrier. These reports will be gathered by a central gateway processor and repackaged into a transmission protocol using, for example, the X.25 packet protocol as a foundation. The transmission protocol is then transported via the existing switched network to a single point of contact (the receiving gateway) at the local provider. The receiving gateway will process the received protocol into reports understood internally by its administrative systems and these translated reports will then be sent, under control of the local provider's equipment to the appropriate action location with the local provider's system. Action will be taken by the local system based upon the received reports and the results will be communicated back to the local system's gateway and via that gateway repacked into a transmission protocol suitable for delivery back through the switching system to the long distance company's gateway.

Using this system the need for a trouble report to be phoned from one company to another and manually copied is eliminated. In addition, from the local operating company's perspective, reports can be received from many different long distance carriers, each packaged according to an agreed-upon protocol and then processed automatically. The converted protocols can be the same for all long distance carriers or they can be unique to each. In either scenario, the internal proprietary administrative protocols of all of the involved companies are maintained since the data that are actually exchanged is a modified transmission protocol agreed upon between each company.

In the embodiment discussed above there are two sets of standards to implement the gateway; namely CMIP and CMISE. CMIP is Common Management Information Protocol and CMISE is Common Management Information Service element. CMIP is the actual protocol that is used to transmit the trouble report information over the X.25 data network. Inside each gateway an Open Systems Interconnection (OSI) stack is used and is based on a seven layer communication protocol. The bottom layer is the pure physical connection used to route the data. The next layer is the data layer, followed by the network layer and then the transport layer.

The upper three layers of the seven layer OSI protocol are the session layer, the presentation layer and the application layer. These upper three layers are known a the CMIP layers.

Each side of the gateway has this seven layer stack. On the local operating company side, however, an application gateway (GW) layer is added to process the information contained in the transmission protocol.

It is one technical advantage of our invention to provide an interface between different telecommunication systems having different internal message structures where the interface is used to transmit inter-system messages without modification to the internal system message structure of either company. The interface allows a single point of contact between the systems regardless of where in the system the internal message is generated or where it is to be delivered.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows a block diagram of the various aspects of the invention having two networks communicating across a jurisdictional boundary via the public switched network;

FIG. 2 shows the layout of the OSI stack;

FIG. 3 shows an expanded layout of the gateway application;

FIG. 4 is a chart showing the transmission protocol; and

DETAILED DESCRIPTION OF THE INVENTION

Figure 5:
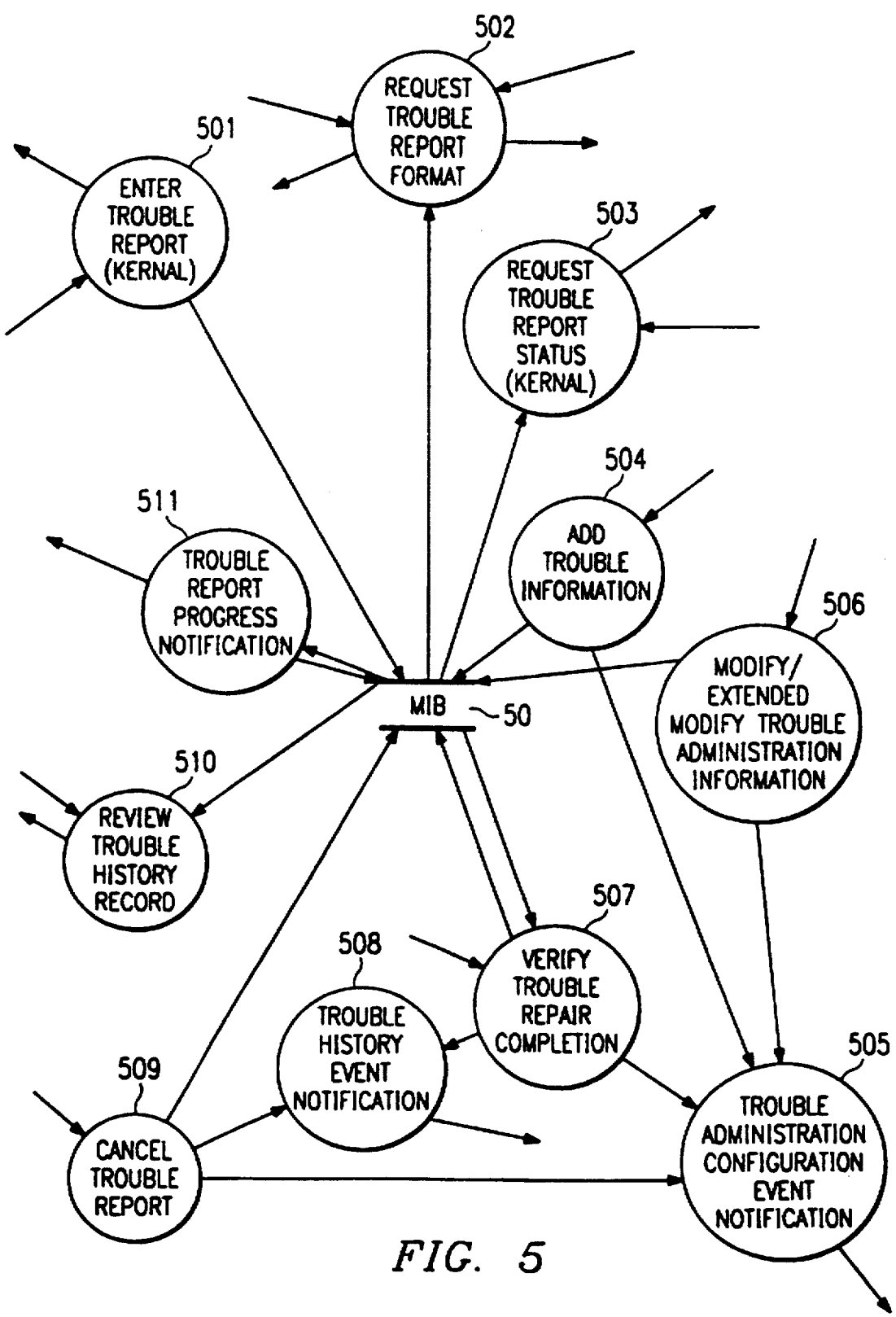
FIGS. 5–8 show functional relationships of the operation of the invention.

FIG. 1 shows one embodiment of our invention used for trouble reporting between long distance carrier 100 and local operating company 10 (such as GTE). On the long distance side of the jurisdictional boundary, there is shown two operation support systems (OSSs) 114 and 115 which support the business processes for trouble administration.

When a trouble occurs with a circuit in network 10, one of these OSSs, for example, OSS 114, would register the trouble. This trouble is picked up by communications processor 112 which is responsible for routing the trouble report to gateway processor 111. Processor 111 then attaches addressing information (as will be discussed) and sends a packet of information through network 17 to gateway processor 11 within local operating company 10. The packet of information contains the identity of the circuit (not shown) that is in trouble. This circuit is controlled (assigned) to a particular OSS, such as OSS 114, within network 10. Processor 11 accesses ACG 12, which, in turn, accesses database 13 and sends a trouble message to OSS 114.

Network 17 could be, for example, a packet network which is a network handling the X.25 protocol. This is contemplated as a packet switched network and processors 111 and 11 would have "phone numbers" assigned just as any other end user's equipment would. However, this could be a private network or a direct linkage.

When PROCESSOR 11 first starts receiving data from PROCESSOR 111 it verifies that the information is genuine and attempts to establish an association between the two gateways. Part of that association is analogous to a log-on or handshake which is interactive to prevent unauthorized networks from gaining access to the trouble reporting system.

If OSS-14 finds a trouble condition an immediate response is sent back confirming the problem. In addition, if the target network determines that a problem exists with any of the information that is received, that problem will be immediately identified and communicated to the sending network via the established linkage.

One example of how the network interacts is that, for every trouble ticket communicated, a link, or an association is established, and that association remains active for the life of the ticket, i.e.,—until the trouble condition is dealt with by the local company. Trouble tickets should only "be active" two to three hours and usually much shorter than that, because a trouble condition implies a lack of service. While the trouble ticket "is active" data pertaining to that trouble passes back and forth across the link associated with that trouble ticket. An alternative would be to drop the link after the initial communication and then recreate the link every time it is desired to pass information back and forth. This usually will not be efficient, especially for monitoring a particular condition.

Let's assume that the association is established for the life of the trouble ticket. In this situation, received information is percolated up through the seven layer stack of PROCESSOR 11 as shown in FIG. 2. Processor 11 (as well as processor 111) comprises the gateway processor and can run on an HP 9000 computer running version 9.0 or higher of the HP-UX operating system. The stack itself is a Retix OSI CMIP software package. The Retix OSI CMIP stack, available from Retix of Santa Monica Calif., is hereby incorporated by reference herein.

Bits arriving from network 17 at the physical layer 201 (FIG. 2) of gateway processor 11 are reconstructed and moved upward through the stack to gateway 20, at which time gateway 20 will perform certain security type functions on the bits and will also perform routing type functions thereon. The gateway will also perform some basic editing on the information and then determine with which ACG platform the data is associated with. Then the received information, which has now been converted to a language understood by the receiving network will be routed, in real time, to the proper OSS of the local company. Each OSS may be geographically diverse from the other OSSs. A company's OSS encompasses the trouble report (ticket) repository, and for each company the OSS functions and operations may be different and proprietary.

There are multiple paths that the information can use within the receiving system, and ACG 12 makes those decisions in real time. If there's a problem proceeding at any point along the way, a response is sent back to the sending network indicating that there is a problem with the reception of that trouble ticket. ACG is a UNIX-based, distributed, client/server application.

The mechanism that is used to route the information received from gateway 20 is distributed application services (DAS), a software product described in publication DAS version 3.0 obtained from GTE Data Services Incorporated of Temple Terrace, Fla., which is hereby incorporated by reference herein.

It should be noted that FIG. 1 shows two OSSs, 14 and 15, for illustrative purposes only. ACG 12 actually communicates in a real time mode with many more different systems.

Some of the systems that ACG 12 communicates with are CNAS (Circuit Network Administration System) and TAS (Trouble Administration System). Some of the other applications ACG 12 communicates with are CABS (Carrier Access Billing System). ACG 12 also communicates with CBSS (Customer Billing Services System) and TCS (Table Control System).

There are six different network paths that an external network can use to get into the backup systems. One path, as discussed with reference to FIG. 1 is via the gateway processors. A second method is via intelligent work station 16 and a dial-up port connected directly to a selected one of the ACGS.

A third network path (not shown) is via TCP/IP (Transmission Control Protocol/Infernet Protocol) into an ETHERNET path. Another long distance company, for example, would use SNA 19 which requires direct access into the ACG. There are two different methods for SNA access. UNIX is basically non-SNA and thus UNIX must be connected to an asynchronous protocol. One solution is to allow for the conversion of SNA to ASYNC, by allowing the use of an ASE board which connects SNA to the X.25 protocol.

Continuing in FIG. 1, the function of gateway processor 11 is to act as a network device without screens. It's not a traditional processor since there are no users logging in to process data. It's a network device very much like a switch, only it performs some reconstruction and repackaging functions to extract the local protocol from the transport protocol. Processor 11 also selects the appropriate ACG to route the information to. This routing is accomplished by looking at the circuit ID provided within the transport protocol from the sending network. ACG 12 then accesses database 13 and based on local network rules, contained within ACG 12, makes a determination of which OSS system to route the information to, all in real time.

Going the other direction, there is implemented what is called proactive notification. Basically, if an event has occurred in one of these backend (OSS) systems that updates information that's been received via the gateway, a system is in place to send the updated data via processor 11 and the established link back to gateway processor 111 of the sending network via packet switched network 17.

In some situations, as discussed above, there will be maintained an open association as long as there is an open trouble ticket. In other situations, the original link will be closed and a new link established under control of processor 11 when a report is due to be sent back to the original sending network.

There is another situation that could occur if a trouble situation occurs in a piece of equipment that has not yet been identified by the long distance carrier. This is called performance management or performance monitoring, where the local operating company detects a problem on a circuit prior to receipt of a "trouble report." In such a situation, network 10 would proactively generate a trouble ticket and then notify carrier 100 that a trouble condition exists.

Continuing now to FIG. 2, gateway processor 11 (similar to gateway processor 111) is shown with its seven-layer stack, which is based on the well-known Open Systems Interconnection (OSI) model. The model's lowest layer is physical layer 201, followed by data layer 202, and then by network layer 203, which are all supported and provided by off-the-shelf X.25 products, such as X.25 software running on OTS-9000 from Hewlett-Packard Company of Palo Alto, Calif. (HP), using the X.25 transport layer.

Layer 204 is the transport layer. Basically, there are three different transport classes; transport class 0, 2 and 4. This is also an off-the-shelf product available from HP Company called OTS (OSI Transport Services).

The upper three layers, which are called the CMIP layers, (even though CMIP is actually all up and down the whole stack) are arranged such that the transport layer 206 communicates to session layer 205 session layer 205, communicates with presentation layer 206, and presentation layer 206 communicates with application layer 207.

There are some tactical controls that each one of these layers performs. Within the stack what happens is that data arrives at the physical layer and percolates up the stack and is rebuilt so that by the time that the data arrives at the application layer the entire message has been rebuilt. Note that even though there is only one physical connection between the sending and receiving gateway processor stacks, there is a virtual connection at each layer of the stack. On top of this OSI stack is the actual gateway which rides on top of the stack.

FIG. 3 is an expanded view of gateway 20. Basically what happens is that application layer 207 hands off the TTOL received by layer 301 and which are processed into the proprietary data structure used by the receiving network by layer 302. Application layer 207 must be tailored to work with layer 301, which is proprietary to the specific network. Note that the seven layer stacks, with the exception of layer 207, could be identical on both sides of the boundary or they could be customized, as long as they can communicate with an established transport protocol.

For convenience of discussion, we can refer to the gateway processor which institutes a "trouble report" or a linkage in the sending network as the manager and the gateway processor in the receiving network as the agent. The manager can ask for a status of a trouble at any time. In other words, it can ask for the latest update you have on a specific report. Likewise any time that a change occurs on a specific report a message will be automatically sent back to the manager from the agent detailing what has changed. Thus, at every instant of time the manager (and the sending network) is aware of what is going on within the target company. This is controlled by the CMISE functional unit and is a capability of the standards.

COMMUNICATIONS PROTOCOLS

We will now discuss one preferred embodiment of our invention with respect to FIGS. 4 through 8. This discussion is directed to one specific embodiment for the purpose of illustrating how the invention will work for a trouble reporting system and is not meant to be limited to only such a system.

A fundamental concern is moving the administration data through an existing packet switched network, as discussed above. For the specific embodiment, it is a requirement to use Open Systems Interconnection (OSI) to support the ANSI T1.227 and ANSI T1.228 standards for Trouble Administration across jurisdictional boundaries. Protocol standards referenced for this purpose are ANSI T1.208 for OSI upper layers (205–207) and ANSI T1.204 for OSI lower layers (201–204). These standards, which are available from The American National Standards Institute (ANSI), 11 West 42nd Street, New York, N.Y. 10036, are hereby incorporated by reference herein.

The OSI seven layer reference model (FIG. 2) describes the framework to provide open systems interconnection. The following table of standards describe protocols used to implement the interconnection in the TMN environment. These standards are available from ANSI, the International Organization for Standardization (ISO), Rue de Varembe, 1, Case Postale 56, CH-1211, Geneva 20, Switzerland, and from the International Telecommunications Union (ITU), Place de Nations, CH-1211, Geneva 20, Switzerland. This information is hereby incorporated by reference herein. In addition, all of the documents noted below are available for reference to aid in the construction and operation of this system.

Layer 207—Application
—Trouble Administration (ANSI T1.227 T1.228)
—System Management Functions (ISO 10164-X)
—CMISE/CMIP (ISO 9595/9596-1,-2) (protocol version 2) functional units-Multiple Reply, Multiple Object Selection, Filtering and Cancel-Get are presently not included.
—ROSE (ISO 9072-1/9072-2 or CCITT X.219/X.229)
—ACSE (ISO 8649/8650 or CCITT X.217/X.227), including Amendment 1 excluded.

Layer 206—Presentation—(ISO 8822/8823 OR CCITT X.216/X.226, ISO 8825 or CCITT X.208/X.209)

Layer 205—Session (ISO 8326/8327 or CCITT X.215/X.225)

Layer 204—Transport (ISO 8072/8073 or CCITT X.214/X.224)
Note: Transport classes supported are TP0, TP2, TP4.

Layer 203—Network (ISO 8208/8878, CCITT X.213/X.223)

Layer 202—Data Link—X.25 LAPB (ISO 7776), version 1984.

Layer 201—Physical—232-C or V.35/ISO 2593

Security

General requirements for security in a CMIP environment have been documented by the ISO and the Network Management Forum (NMF), 1201 Mt. Kemble Avenue, Morristown, N.J. 07960. It is anticipated the public switched network will be a Packet Switched Network. The ISO's OSI general security model provides requirements for authentication at the CMIP application level as well as password aging/password encryption and also requires that the gateway processor provide authentication at lower layers in the OSI stack.

X.25 will be implemented using closed user groups (CUG) to restrict access to the agent by the manager or manager look-alikes. X.25 can also provide password access control.

The Network Management Forum document Forum 016, Security of Inter-operable Network Management, which is hereby incorporated by reference herein, provides a compendium of the current state of OSI security standards. Thus, it furnishes a valuable index into relevant standards. The Network Management Function, Forum 024, states that it assumes that Forum 016 is adequate for trouble management security. Forum 016, discusses OSI security services and mechanisms under the following general topics:

1) Peer-entity authentication
2) Access control
3) Security alarm

Peer-entity Authentication

The gateway processor uses a one-way peer-entity authentication at association time. The agent Compliant Management Entity (CME) will authenticate the manager peer-entity, i.e., the gateway processor will ensure that a CME wishing an association is the manager CME it claims to be.

ISO Amendment 1 to ACSE includes a functional unit for exchange of authentication information. The details of authentication mechanisms and values are included in Forum 016, imported from OSI Implementation Workshop (OIW) Stable Agreements.

Access Control

Once the identity of the initiator (manager) at the sending network of the association has been authenticated, the agent must validate the privileges of the manager. Access Control Protocol Information (ACPI) is carried in the CMIP UserInfo Access Control field and CMIP access control parameter. A standardized format for ACPI is not available, however, Forum 016 Annex E provides a suggested format that can be used in the implementation.

Security Alarm

The approach to handling security alarms in Forum 016 is based on ISO standards ISO 10164-4, 10164-5, and 10164-7.

Security Audit Trail

The approach to handling security trails in Forum 016 is based on ISO standards ISO 7498-2, ISO CD 10181-7, and ISO DIS 10164-8. The latter two standards are not fully ratified.

Transactions which were not completed, and for which manual reporting was subsequently performed, may during recovery operations, cause agent gateway processor 11 to generate error messages or forward ACG OS generated error messages to manager 110. For example, error messages may concern a trouble that has already been created, or a trouble report that has already been closed. It is the responsibility of manager 110 and of the Interexchange Carrier (IC OS) to either void the transactions so that they are not presented to agent 11, or to accommodate the resulting error messages.

Overview of Interface to Gateway Processor

The ANSI T1M1.5 standards use an object oriented paradigm for trouble administration. ACG 12 uses a record oriented paradigm. Gateway processor 11 provides the mapping between the two.

An example would be the object oriented attribute GET operation. To actually implement this on the ACG system, the processor performs a trouble report read and obtaining the requested attribute which will be extracted.

Any behavior specified for an attribute will have to be performed by ACG 12 that does not already perform this behavior. This may involve additional record transactions within ACG 12.

Processor 11 does not normally maintain its own private copy of any trouble report information. Within ACG, the data that makes up one complete trouble report instance is distributed across different systems. Part of the data is located in database 13 (FIG. 1) FOR A PARTICULAR ACG SYSTEM 18 (e.g. when trouble reported, suspect out of service). When a trouble report is requested ACG 11 extracts the data from both locations before returning it to the requester. This brings about two limitations that must be reflected to the T1M1.5 CMIP interface.

1. If ACG is unable to communicate with TAS 18, a GET on an attribute, not stored in the ACG informix database will cause an error condition to be encountered and an error message returned.

2. CMIP scoping and filtering will need to be limited to setting or getting attributes that are only maintained in the local ACG database. To affect attributes maintained in TAS 18 across multiple trouble reports would impact normal TAS operations due to the large number of transactions that would be required, and the response time for such a request is likely to be unacceptable to the manager system.

The data distribution also brings about a requirement that must be satisfied by the ACG system. If an attribute is identified in the standard as write-only by the "manager" system (i.e. the long distance carrier) and can be modified within the ACG environment, a separate "manager only" copy is maintained.

FIG. 4 shows a chart of the functions performed by the system and the objects all as processed by gateway 20 (FIG. 3). The following discussion is with reference to FIG. 4.

The PT-CREATE Service is used by a manager to request that a trouble report be created by the agent. This function is a part of the Kernel Functional Unit.

The manager shall supply the following ANSI T1.227 mandatory attributes as part of the Telecommunications Trouble Report object class create operation:

Managed Object Instance (Circuit ID of trouble circuit)

Trouble Type

Additional Trouble Information List

The manager will also supply any attributes in conditional packages identified as "must be present" attributes. The Section 5.1.10, Request Trouble Report Format, further describes the "must be present" attributes will be discussed.

Also, all mandatory attributes specified in the Section Managed Object Conformance Statement (MOCS) (as discussed hereinafter) proformas, shall be supplied by manager processor 110.

The agent processor supplies the following ANSI T1.227 attributes in the attribute list parameter when responding to a successful create operation:

Received Time

Trouble Report Identifier

Name Binding

Object Class

Trouble Found

Trouble Report State

Trouble Report Status

Trouble Report Status Time

The agent is also required to supply values for the remaining attributes supplied by the manager processor plus any agent processor supplied attributes in conditional packages identified as "must be present" Also, all mandatory attributes specified by the MOCS proformas, shall be supplied by agent processor 11.

The following conditional attributes may "conditionally" be supplied by the manager:

Location Access Address

Location Access Hours

Location Access Person

Managed Object Instance Alias List

Perceived Trouble Severity

Preferred Priority**

Trouble Report Status Window

TSP Priority**

**TSP Priority and Preferred Priority are mutually exclusive.

The agent processor the object creation notification whenever the agent creates a trouble report.

The Trouble Report Creation Service supports the following processing failure specific errors:

(The Parameters to support these error messages are defined in section 7.3 of the ANSI T1.227.)

Trouble Report Already Exists (7.3.1)

This error message is required when a trouble report already exists for the same Managed Object Instance. The OS restricts only one trouble report per the same source identification (e.g. circuit id, telephone number, etc.).

Fallback Reporting

This error is applicable in the following two cases:
Service pre-designated by agent to receive fallback reporting.
Agent partially failed or temporarily unavailable for receiving trouble reports.

Trouble Report "Must be Present" Attribute Missing

This error message is required when the agent receives the create request with one or more of the "must be present" attributes missing.

Request Trouble Report Status

The agent will allow a manager to request status information on a trouble report. The PT-GET service is used by a manager to request status information on a trouble report. This function is a part of the Kernel Functional Unit.

The agent allows the manager to view the following mandatory attributes in the Telecommunications Trouble Report (TTR):

Trouble Report Status
Trouble Report Status Time

Other "readable" and supported TTR attributes may also be present in the request. The agent shall also allow the manager to view the following mandatory attributes for the PT-GET service request.

Additional Trouble Information List
Managed Object Instance
Received Time
Trouble Found
Trouble Report Identifier
Trouble Report State
Name Binding
Object Class
Trouble Type The agent will allow the manager to view a specific subset of trouble reports using the scoping and filtering capabilities of Common Management Information Service Element (CMISE).

The agent will allow a manager to update an open trouble report with additional trouble related information.

The PT-SET service is used by a manager to provide additional descriptive text for an open trouble report.

The Additional Trouble Information List attribute in the preferred embodiment can only be supplied by the manager and updated by the manager.

The Additional Trouble Information List attribute further describes the selected Trouble Type. A minimum of 256 characters are supported. The manager can only add information, but not remove it. The oldest information may be not be readable by the manager because of implementation restrictions on the maximum sizes but the information will be permanently recorded in the ACG system.

The agent will allow a manger to modify the "writable" attributes, if the associated "Modify" and/or "Extended Modify" Functional Units were successfully negotiated during the association establishment phase.

The PT-SET service is used by a manager to modify the "writable" attributes supported by the agent.

The ANSI T1.228 Modify Trouble Administration Information Functional Unit allows the manager to modify the following TTR attributes:

A Location Access Address
A Location Access Hours
A Location Access Person
After Hours Repair Authorization
Alternate Manager Contact Person
Alternate Manager Contact Object Pointer
Authorization List
Callback Information List
Commitment Time Request
Escalation List
Managed Object Access From Time
Managed Object Access Hours
Managed Object Access To Time
Manager Contact Person
Manager Contact Object Pointer
Manager Search Key List
Perceived Trouble Severity
Trouble Clearance Person
Trouble Report Status Window
Z Location Access Address
Z Location Access Hours
Z Location Access Person Note that Section 9.8 of T1.228 as originally written, did not intend to exclude any attributes. However, when the specific list of Network Management Forum (NMF) attributes were added, the "NOTE" in Section 9.8 of ANSI T1.228 was not updated. This resulted in ambiguous wording of Section 9.8 of ANSI T1.228. Consequently, the NMF created the Extended Modify Trouble Administration Information Functional Unit (FU) to cover the additional attributes.

The Forum 024 Extended Modify Trouble Administration Information Functional Unit allows the manager to modify the following TTR attributes:

Dialog
Manager Search Key 1
Manager Search Key 2
Manager Search Key 3
Preferred Priority
Repeat Report
Trouble Detection Time There are two other TTR attributes, Cancel Requested By Manager attribute and Close Out Verification attribute, that can only be modified by the manager if the associated Functional Units were successfully negotiated during the association establishment phase.

The following attributes are "optional".

A Location Access Address
A Location Access Hours
A Location Access Person
Authorization List
Commitment Time Request
Escalation List
Managed Object Access Hours
Perceived Trouble Severity
Trouble Report Status Window Dialog The agent will notify the manager when there is a configuration event change. The PT-EVENT-REPORT service is used by the agent to notify the manager when:

An AVC attribute value change notification is used, the value of an attribute is changed, or An object creation/deletion notification is used, the object instance is created or deleted by the agent.

An Attribute Value Change (AVC) Notification is generated by the agent when there is a change in the value of a TTR attribute, except for a change in the value of TTR Status Time attribute. The Trouble Report Status is mapped to the ANSI T1.227 values.

The manager can create the TTR object in the agent system. The TTR object may also be created locally by the agent on behalf of the manager and only the agent can delete a TTR. The manager cannot create or delete a Trouble Report Format Definition (TRFD).

The agent generates the TTR object creation and TTR object deletion notifications whenever the agent creates the TTR object or deletes the TTR object through local administrative procedures.

The PT-EVENT-REPORT service is used by the agent to notify the manager of object creation and deletion.

The status of the trouble report will be updated as the problem it relates to is progressed to resolution. A manager should be able to track the progress of a trouble report resolution by requesting the Attribute Value Change Notification service.

The PT-EVENT-REPORT service is used by the agent to notify the manager of changes in the values of Trouble Report Status and Commitment Time attributes of TTR.

The manager can verify that closing can proceed by the agent after receiving the appropriate notification for trouble reports that require verification by the manger before closure.

The PT-SET service is used by the manager to verify that repair has been completed to its satisfaction before the trouble report is permanently closed-out by the agent. The PT-SET request by the manager shall also include an identification of the person verifying the trouble report. When the trouble has been repaired and the agent issues an AVC notification to the manager with the value of Trouble Report Status attribute changed to "cleared Awaiting Cust Verification", the manager issues PT-SET with the Close Out Verification and Trouble Clearance Person attributes of TTR.

Once the agent receives the PT-SET to change the value of the Close Out Verification attribute of TTR to "verified", the agent changes the value of the Trouble Report Status attribute to "closed Out Cust Verified".

If the manager determines that the trouble still exists and does not send a "verified", the manager shall use the PT-SET to change the value of Close out Verification attribute to "denied". The agent will resume work on the trouble report by moving the trouble report to the Open/Active state.

If the manager responds with a value of "denied" when it believes that the trouble still exists, it may also include the Dialog attribute to provide additional information for the agent to work with the trouble. This is the additional information exchange which is not addressed in the ANSI T1.228.

If the manager issues the verify request by PT-SET to change the value of the Close Out Verification attribute before the Trouble Report Status value is "cleared Awaiting Cust Verification", the agent will respond with a processing failure error message "Cannot Verify or Deny At This Time".

If the manager issues PT-SET to change the value of the Close Out Verification attribute to "denied Activity Duration Disputed", the manager basically does not agree upon the outage duration. The manager may also provide other relevant attributes. The agent is required to either resume work on the trouble report by moving the trouble report to the Open/Active state or if the agent disagrees with the manager then the agent will change the value of Trouble Report Status attribute to "closed Out Cust Denied".

If the manager issues PT-SET to change the value of the Close Out Verification attribute to "denied Closed Out Narr Disputed", the agent is required to close the trouble report by changing the value of Trouble Report Status attribute to "closed Out Cust Denied".

If the manager has not "verified" or "denied" a repair within the given time period, the agent will change the value of Trouble Report Status attribute to "closed Out".

The change in the value of TTR attributes during verify process will always result an AVC Notification to the manager.

The agent allows a manager to make a cancellation request of a trouble report.

The PT-SET service is used by the manager to attempt to remove a trouble report from the agent.

The manager will issue a PT-SET request to change the value of the Cancel Requested By Manager attribute in the TTR object to "True". The PT-SET request by the manager also includes a Trouble Report Clearance Person attribute value identifying the person requesting cancellation of the trouble report.

When the cancellation request is accepted by the agent, the agent clears the trouble report by changing the value of the Trouble Report Status attribute in the TTR object to "close Out By Cust Req".

The cancellation process may have associated billing implications if work has already started on the trouble (e.g. testing dispatched). The agent may not cancel the trouble report immediately.

If the trouble report is already cleared, the agent will respond to the PT-SET with processing failure error message "Cannot Close".

The PT-EVENT-REPORT service is used by the agent to indicate progress made in resolving the trouble report.

The Trouble Report Progress Notification is generated by the agent within the maximum time allotted by the trouble Report Status Window attribute if it is present in the instance of TTR.

Once the Trouble Report Progress Notification is sent, the value of trouble Report Status Window attribute is automatically reset by the agent and begins to count down again.

The notification shall include the mandatory trouble Report Status attribute. If the value of the status has not changed since the last Trouble Report Progress Notification issued, then it must also include the additional Trouble Status Info attribute indicating what progress has been made in resolving the trouble report.

The agent will allow a manager to retrieve the applicable trouble report format to be used prior to reporting a trouble.

The PT-GET service is used by the manager to determine the format for reporting a trouble. Based on the trouble report format, the manager supplies a different set of attributes when creating a trouble report.

The appropriate instance of the Trouble Report Format Definition object is identified through one of the following ways:

When the format must be defined on an object instance basis, the manager issues the PT-GET request of the trouble Report Format Object Ptr attribute in the CNM Service object.

When the format is the same for all instances of the same object class, the manager issues the PT-GET request of the applicable Managed Object Class List attribute in the TRFD object.

When the format is specific to the object instance, the manager issues the PT-GET request of the applicable Managed Object Instance List attribute in the TRFD object.

The manager cannot create or delete TRFD object instances.

The TTR attributes which "must be present" are determined by a PT-GET on the TR Must Be Present Attr ID List attribute in the appropriate instance of the TRFD object.

The TTR attributes which "may be present" are determined by a PT-GET on the tR May Be Present Attr ID List attribute of the TRFD object.

The following attributes "must be present" when the manager issues the PT-CREATE request to create a trouble report using Format-1:

A Location Access Address
A Location Access Hours
A Location Access Person
Additional Trouble Information List
Commitment Time Request
Customer Trouble Ticket Number
Managed Object Instance
Manager Contact Person
Trouble Report Format Object Pointer
Trouble Report Status Window
Trouble Type The following attributes "may be present" when the manager issues the PT-CREATE request to create a trouble report using Format-1:

Authorization List
Dialog
Managed Object Access Hours
Managed Object Instance Alias List
Name Binding
Perceived Trouble Severity
Preferred Priority
Repeat Report
TSP Priority The following attributes "must be present" when the manager issues the PT-CREATE request to create a trouble report using Format-2:

Additional Trouble Information List
Commitment Time Request
Customer Trouble Ticket Number
Managed Object Instance
Managed Object Instance Alias List
Manager Contact Person
Perceived Trouble Severity
Trouble Report Format Object Pointer
Trouble Type The following attributes "may be present" when the manager issues the PT-CREATE request to create a trouble report using Format-2:

Authorization List
Dialog
Managed Object Access Hours
Name Binding
Preferred Priority
Repeat Report
TSP Priority The agent shall notify the manager with trouble history information whenever the Trouble Report Status attribute value changes to a final closed-out value.

The PT-EVENT-REPORT service is used by the agent to report the trouble report close-out information to the manager or log the information in the agent.

The notification shall include the following "mandatory" trouble report close-out information:

Managed Object Instance
Received Time
Trouble Found

The notification may include the following "optional" trouble report close-out information:

Activity Duration
Additional Trouble Information List
Authorization List
Cancel Requested by Manager
Close Out Narrative
Close Out Verification
Commitment Time
Customer Trouble Ticket Number
Perceived Trouble Severity
Restored Time
Trouble Clearance Person
Trouble Report Number List
Trouble Type Using the Trouble History Event Notification and associated logging, the agent is able to log a subset of the trouble report information when a trouble report is closed, and can retain that information for a period of time. It should be possible for the agent to delete a trouble history record The logging is described in Section 4.4. Event Reporting, OSI and Non-OSI Logging.

This Functional Unit allows the manager to review the Trouble History Records. The PT-GET service is used by a manager to request the history information.

The Trouble History Record (THR) object is a repository for selected information from a TTR object. The THRs are contained in a LOG object. If the LOG is deleted, all of its contained THRs shall also be automatically deleted by the agent.

The agent shall allow the manager to view the following mandatory attributes in the Trouble History Record:

Event Time
Event Type
Log Record Id
Logging Time
Managed Object Class
Managed Object Instance (ISO/IEC 10165-2)
Name Binding
Object Class
Managed Object Instance (ANSI T1.227)
Received Time
Trouble Found Other "readable" THR attributes may also be present in the request.

The following section treats the ANSI T1.228 standard as a defined "business area" showing data flows between T1.228 functional units (FU). The data flow diagrams shown in FIGS. 5–8 do not represent an implementation or a design, but solely a description of the operation between functional units.

The following description is divided into a subsection for functional units which are involved in responding to manager initiated operations, and another subsection for functional units which are involved in reporting events on agent activity.

The data flow narrative for the first subsection starts on FIG. 5 with Enter Trouble Report (Kernel) 501 and goes in a clockwise direction.

Figure 6:
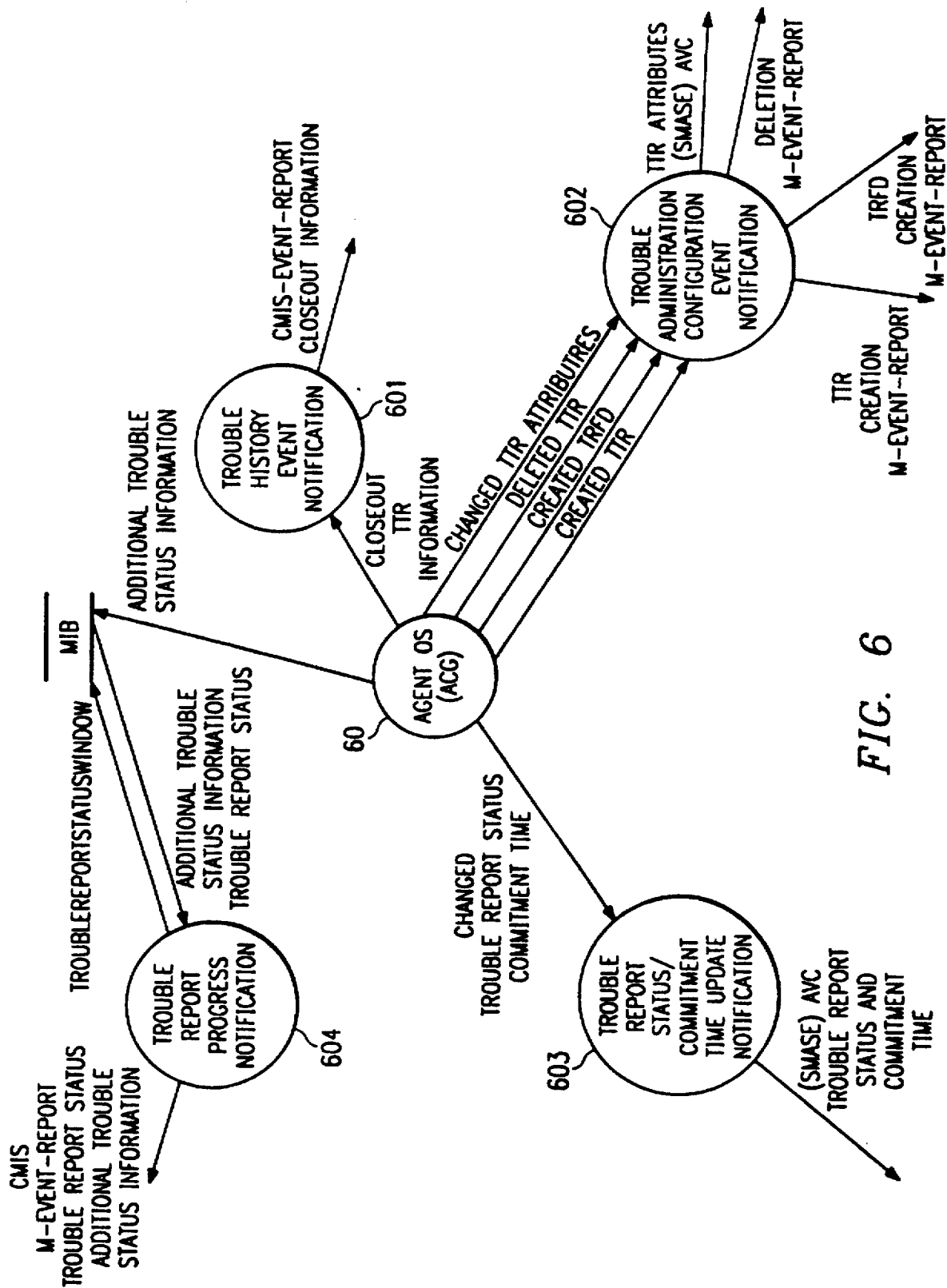

The data flow narrative for the second subsection starts on FIG. 6 with Trouble History Event Notification 601 and goes in a clockwise direction.

As shown on FIG. 5, the kernel functional units have been split into the two kernel services Enter Trouble Report and Request Trouble Report 501 status 502. The ANSI T1.228 Modify functional unit has been combined in the data flow diagram with the Network Management Forum's Extended Modify functional unit.

Arrows which input into notification functional units do not specify how these data flows would be implemented in practice. Data is not necessarily transferred directly to a notification functional unit: the Modify/Extended Modify 505 could update Management Information Base (MIB) 50 which would have triggers for passing data to a notification functional unit. What is of interest here, however, is that, through some mechanism, the Modify/Extended modify causes data to be input to a notification functional unit. The objective of FIG. 5 is to show the relationship of functional units. On association establishment between manager and agent a subset of T1.228 functional units can be negotiated. These data flow diagrams highlight the dependencies between functional units.

INPUT: The protocol data unit (PDU) PT-CREATE is passed across the manager to agent interface and is input to the Enter Trouble Report functional unit. The PT-CREATE contains the manager supplied attributes for the new Telecommunications Trouble Report.

TO MIB: The agent adds attributes to those supplied by the manager and the Telecommunications Trouble Report is put in the agent MIB.

OUTPUT: On a successful completion of a PT-CREATE the PDU is returned with all the attributes of the Telecommunications Trouble Report which were added to the MIB.

INPUT: The PT-GET CNM Service is input to Request Trouble Report Format. The PT-GET includes the service ID as the relative distinguished name of the CNM Service object instance.

OUTPUT: On a successful completion of the PT-GET CNM Service, the PT-GET is returned with the format ID for the Trouble Report Format Definition object.

BOX 502
OPTION 2

INPUT: The PT-GET Trouble Report Format Definition is input to Request Trouble Report Format. The PT-GET includes format ID as the relative distinguished name of the Trouble Report Format Definition object instance.

OUTPUT: On a successful completion of the PT-GET Trouble Report Format Definition, the PT-GET is returned with the tr Must Be Present Attri List and/or the tr May Present Attr ID List. These list attributes give attributes for a trouble report format which have been specified as required for the trouble report and optional for the trouble report respectively.

BOX 503

INPUT: The PT-GET Telecommunications Trouble Report is input to Request Trouble Report Status. The PT-GET includes trouble Report ID as the relative distinguished name of the Telecommunications Report object instance. The PT-GET includes a list of requested attributes. This list can include the trouble Report Status and/or trouble Report Status Time attributes with other "readable" attributes.

OUTPUT: On a successful completion of the PT-GET Telecommunications Trouble Report, the PT-GET is returned with the value of the list requested attributes.

BOX 504

INPUT: A PT-SET is input to update additional Trouble List Info attribute.

OUTPUT: An indication of the change to additional Trouble List Info attribute is output to Trouble Administration Configuration Event Notification FU.

TO MIB: The additional Trouble List Info attribute is updated in the Telecommunications Trouble Report.

a) INPUT: Changed attribute values from a Telecommunications Trouble Report are input, in some fashion, from Modify/Extended Modify Trouble Administration FU activity.

b) Changed attribute values from a Telecommunications Trouble Report for close Out Verification and trouble Clearance Person are input, in some fashion, from Verify Trouble Repair Completion FU activity.

c) Changed attribute values from a Telecommunications Trouble Report for cancel Requested by Manager and trouble Clearance Person are input, in some fashion, from Cancel Trouble Report FU.

OUTPUT: An Attribute Change Notification is issued, to the manager.

INPUT: A PT-SET indicating new updated values for a list of attributes is input. Some attributes are updatable by the Modify Trouble Administration Information FU, others are updatable by the Extended Modify Trouble Administration Information FU.

OUTPUT: If updates were made to allowable attributes other than trouble Report Status or commitment Time, then in some fashion, an indication of these attribute updates is passed to Trouble Administration Configuration Event Notification FU.

TO MIB: The changed attributes of the Telecommunications Trouble Report are updated in the MIB.

BOX 508

INPUT: a) A PT-SET to close Out Verification and trouble Clearance Person attributes are input. The close Out Verification attribute is set to "verified" or "denied".

b) The trouble Report Status in the MIB, for the Telecommunications Trouble Report, is checked to ensure that the agent has changed it to "cleared Awaiting Cust Verification".

OUTPUT: On closure a subset of attributes of the Telecommunications Trouble Report are output, in some fashion, to Trouble History Event Notification FU.

TO MIB: The closed Out Notification and trouble Clearance Person attributes are updated in MIB.

BOX 508

INPUT: a) The subset of attributes of the Telecommunications Trouble Report are input, in some fashion, from Verify Repair Completion FU.

b) The subset of attributes of the Telecommunications Trouble Report are input, in some fashion, from Cancel Trouble Report FU.

OUTPUT: A CMIS M-EVENT-REPORT reports closeout Telecommunications Trouble Report attribute values to manager or to a log on agent system.

INPUT: A PT-SET is input updating the cancel Requested By Manager and trouble Clearance Person attributes. The cancel Requested By Manager attribute is updated to "True".

OUTPUT: a) on closure the attributes of the Telecommunications Trouble Report are output, in some fashion, to Trouble History Event Notification FU.

b) The changed values of cancel Requested By Manager and trouble Clearance Person attributes are output, in some fashion, to Trouble Administration Configuration Event Notification FU.1.

TO MIB: The Cancel Requested By Manager and trouble Clearance Person attributes of the Telecommunications Trouble Report are updated in the MIB.

BOX 510
INPUT: A PT-GET on Trouble History Record attributes is input.
MIB: Trouble History Record attributes are retrieved from the MIB.
OUTPUT: The Trouble History Record attributes are returned to the manager.
BOX 511
INPUT: The trouble Report Status Window attribute defines the maximum interval of time expected between progress notifications.
OUTPUT: The trouble Report Progress Notification is sent to the manager. It includes the trouble Report Status attribute, and it will also include additional Trouble Status Info if the trouble Report Status has not changed since the last trouble Report Progress Notification.

FIG. 6 SHOWS THE NOTIFICATION PROCESS FOR THE OS

Figure 7:
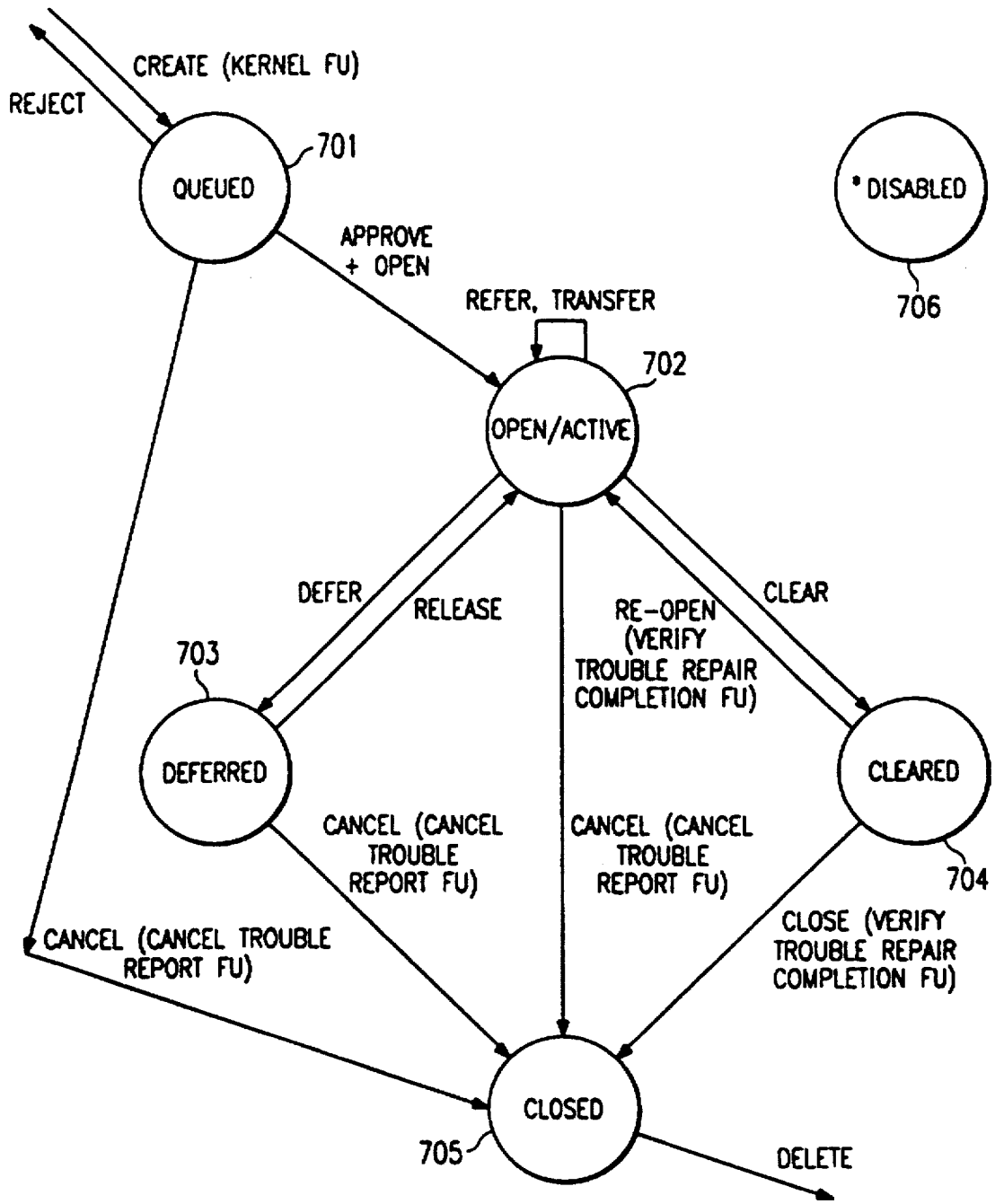

INPUT: A subset of the attributes of the Telecommunications Trouble Report are input, in some fashion, from the closeout of a Telecommunications Trouble Report by the Agent OS.
OUTPUT: A CMIS M-EVENT-REPORT reports closeout Telecommunications Trouble Report attribute values for reporting to the manager or for OSI logging
BOX 602
INPUT: a) Changed attribute values from a Telecommunications Trouble Report are input, in some fashion, resulting from update activity on the agent side.

b) An indication of the delete of a telecommunications trouble report object is input, in some fashion, resulting from the delete of a telecommunications trouble report on the agent side.

c) An indication of the creation of a telecommunications trouble report object is input, in some fashion, resulting from the creation of a telecommunications trouble report on the agent side.
OUTPUT: a) An Attribute Change Notification including changed attributes is issued, for reporting to the manager or for OSI logging.

b) A CMIS M-EVENT-REPORT reports the delete of a Telecommunications Trouble Report for reporting to manager or for OSI logging.

c) A CMIS M-EVENT-REPORT reports the creation of a Telecommunications Trouble Report for reporting to manager or for OSI logging.
INPUT: An indication of updates made to trouble Report Status and/or commitment Time is input, in some fashion, resulting from update activity on the agent side.
INPUT: The trouble Report Status Window attribute to define the maximum interval of time expected between progress notifications.
OUTPUT: An Attribute Change Notification including trouble Report Status and/or commitment Time is issued, for reporting to the manager or for OSI logging.
NOTE: BOX 604 DESCRIPTION MISSING FIG. 7 shows the State Diagram for TTRS. The Trouble Report State attribute indicates the current state of a trouble report. A trouble report may be in the following states as defined below:
Queued Box 701

A trouble report is in a queued state when it has been created, but the trouble resolution process has not yet been initiated. An example is screening.
Open/Active State—Box 702

This is the active phase of the trouble report when appropriate actions to resolve the trouble are being carried out.

Example: testing, dispatched In, dispatched Out, start Repair, pending Test, pending Dispatch, request Repair, referMtceCenter, refer Vendor, canceled Pending Work In Progress, canceled Pending Test Completion, canceled Pending Dispatch Completion.
Deferred State Box 703

This state indicates that the corrective action on the trouble report has been postponed. A deferred report can become open/active when specific conditions are met.

Example: no Access Other, start No Access, stop No Access, start Delay Mtce, stop Delay Mace.
Cleared State Box 704

This state indicates that the trouble has been corrected. If the manager needs to verify that the trouble has been resolved, verification may optionally be awaited by the agent prior to closure of the trouble report.
Example:

Temporary Ok, cleared Cust Not Advised, cleared Cust Advised, cleared Awaiting Cust Verification.
Closed State Box 705

This state indicates that the trouble has been corrected and a trouble history notification is emitted. Under specific conditions, a request to cancel a trouble report may be accepted from Queued, Open/Active, or Deferred States.
Example:

Closed Out, closed Out By Cust Req, closed Out Cust Verified, closed Out Cust Denied.
Disabled State Box 706

Figure 8:
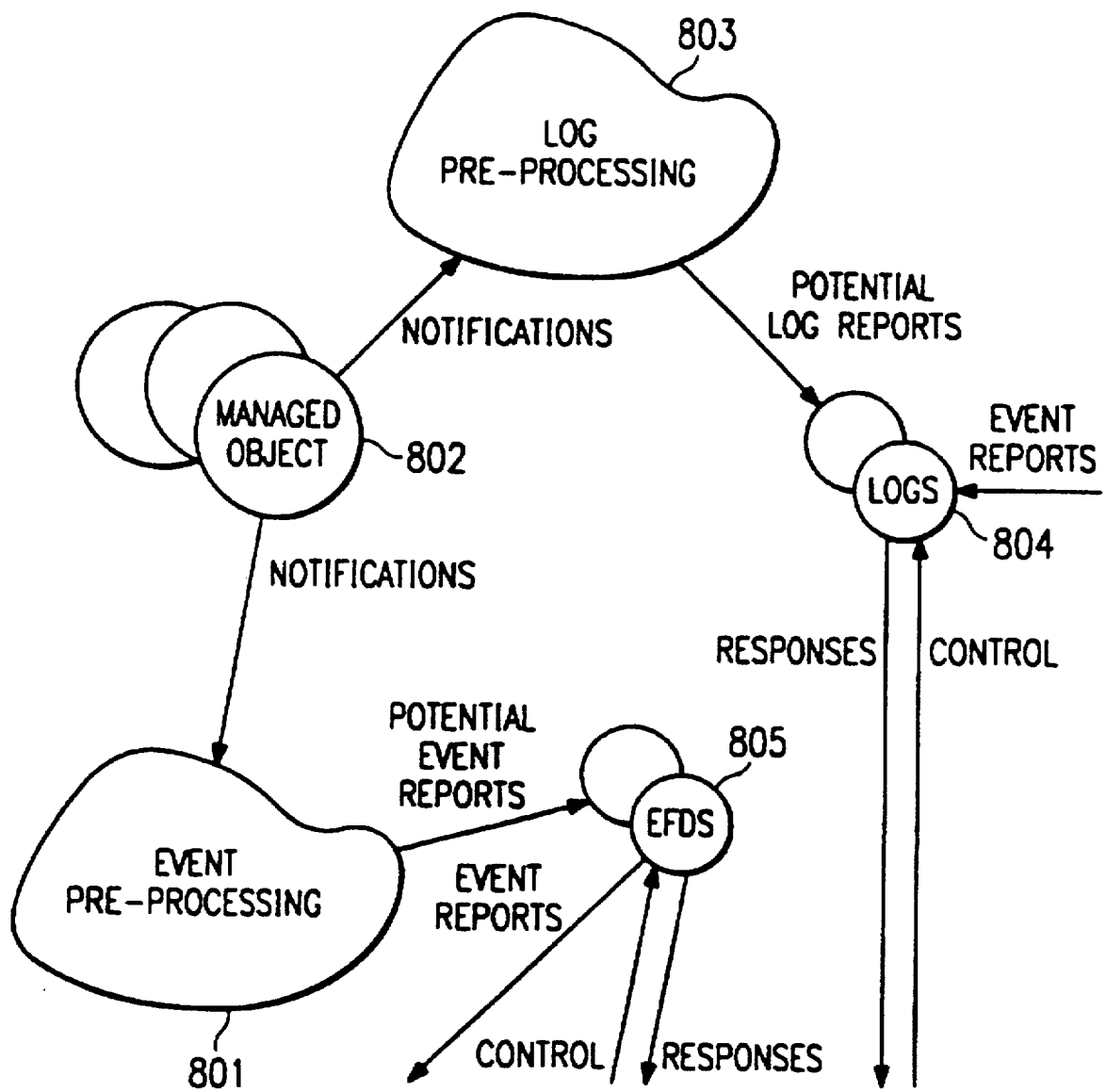

An instance of a trouble report exhibits a disabled value when its information cannot be updated due to local conditions. In the disabled condition only read operations can be performed on the trouble report object instance.
OSI Event Reporting, OSI and NON-OSI Logging FIG. 8 shows the model for Event Reporting (ISO/IEC 10164-5) which manages the notifications emitted by managed objects. These notifications are subject to an "event pre-processing function" which outputs "potential event reports". The standard states that "conceptually these potential event reports are distributed to all Event Forwarding Discriminators that are contained within the local system" (ISO/IEC 10164-5). Event forwarding discriminators are created by the manager, to maintain control over which event reports may be forwarded to the manager, by the agent.

The manager can create, delete, read, and modify the discriminator. By manipulating the "discriminator construct" within the event forwarding discriminator, a manager can decide to receive certain potential event reports or not, based on discriminator construct assertions about attribute values within a potential event report.

Conceptually means, in this context, that all potential events must be passed to all event forwarding discriminators, thereby causing security concerns. The gateway will interface with multiple networks. Each network will have notifications emitted by their reported Telecommunications Trouble Reports. If these notifications become potential event report which are "distributed to all Event Forwarding Discriminators that are contained within the local system" then one IC might see the notifications of another simply by modifying the discriminator construct within one of their event forwarding discriminators. According to ISO/IEC 10164-5, control of the event forwarding discriminator and the discriminator construct is the prerogative of the manager.

We shall thus modify the interpretation of "conceptually", to allow an event pre-processing function restricts the distribution of potential event reports. The event pre-processing function would restrict distribution solely to event forwarding discriminators which were setup by the same manager that is authorized to access the managed objects emitting the notifications.

The processor agent in its implementation of event reporting provides no facilities (currently) for long term queuing potential event reports. A manager can create an event forwarding discriminator which uses a scheduling package. A scheduling package provides an ability to switch automatically between a reporting-on and a reporting-off condition based on time parameters. In a reporting-off condition potential event reports will not be input and processed by the event forwarding discriminator. Any potential event reports that occur during a reporting-off condition will be discarded.

The event forwarding discriminator provides a destination (application entity title) for the event forwarding discriminator to send potential reports. If no event forwarding discriminator exists for a manager system, no events will be forwarded.

The OSI model for logging (ISO/IEC 10164-6) has similarities to event forwarding. Notifications that are emitted from managed objects are passed to log pre-processing at the same time that they are passed to event-pre-processing. After log pre-processing, potential log reports are distributed to every log managed object. Just as each event forwarding discriminator can use discriminator constructs to control which potential reports are forwarded to the manager, each log managed object can use discriminator constructs to decide whether to accept a potential log report. (See FIG. 5, entitled Relationship Between Event Reporting and Log Management Models).

The manager associate/disassociate audit log will be kept database table similar to, but separate from the interactive user logon audit log, with purge interval controls consistent with the user logon audit log.

Because the manager controls the creation of the log, deletion of the log, modification of log attributes, suspension of the activity of the log, deletion and retrieval of log records, and resumption of log activity, the same security concern arises in OSI logging as with OSI event forwarding. The agent system must avoid sending potential log records to every log and must restrict distribution solely to logs which were setup by the same manager that is authorized to access the managed objects emitting the notifications. This would be done within log pre-processing.

Logs can include scheduling packages. If a logging-off condition exists then potential log reports are not queued waiting for a logging-on condition. Thus unless an alternate log was setup by the manager and that log was in a logging-on condition, the setting of a log to a logging-off condition will result in the loss of a log report.

Protocol Data Units (PDU) received from the peer-system can be system management operations or event report notifications. Such event reports are directly presented to the logs. (Here again we would have to introduce a filtering process to insure that event reports from one IC do not go to another. Event reports from the manager are not expected in the first release of MIC.) Receiving event reports across the OSI interface would only occur when the receiving system is acting as the manager. GTE will only operate in this mode in later releases of the MIC.

Management operations are modelled as generating notifications at the agent system when they are received by the relevant protocol entity. Notifications must be defined for the system management operations of interest. Once these notifications are emitted they go to log pre-processing (as well as event pre-processing). After log pre-processing they will be presented to the logs as potential log-reports. Non-OSI Logging An audit trail of "manager" accesses and trouble report changes must be maintained for the purposes of recovering lost data, or trace the security related events.

The current ACG implementation has defined and is maintaining an audit trail of all pertinent activity on a trouble report (who changed what data, and when).

The only additional audit information required that would normally be created by the User Interface (which the MIC replaces in the electronic interchange environment) is a record of when a manager application attempts (successful or not) to establish an association (connects to the GTE application) and when it breaks the association (release, abort, or communication failure).

The manager associate/disassociate audit log will be kept in two database table similar to but separate from the interactive user logon audit log, with purge interval controls consistent with the user logon audit log.

Although the present invention and its advantages have been described in detail, it should be understood that various changes, substitutions and alterations can be made herein without departing from the spirit and scope of the invention as defined by the appended claims.

What is claimed is:

1. A processor for use between telecommunication networks for controlling the control data between said telecommunication networks, said control data of each telecommunication network being incompatible with control data from other of said telecommunication networks, and wherein at a sending one of said telecommunication networks said control data are generated from a plurality of geographically-separated systems and wherein at a receiving one of said telecommunication networks said control data are directed to one of the plurality of geographically-separated systems, the particular one of said plurality of geographically-separated systems being unknown to said sending telecommunication network, said processor comprising:

means for accepting data from any one of said plurality of geographically-separated systems associated with a sending one of said telecommunication networks;

means for organizing said accepted data into a message protocol for transport on a common communications network to a selected receiving telecommunication network;

means for accepting a transported message protocol from a sending one of said telecommunication networks and for converting said message protocol into the control data usable by said plurality of geographically-separated systems associated with said receiving telecommunication network;

means for controlled by data contained within each said converted message protocol for determining which one of said plurality of geographically-separated systems associated with said receiving telecommunication network said converted message protocol is directed to; and means for communicating said control data from each said converted message protocol to the proper one of said plurality of geographically-separated systems within said receiving telecommunication network under the control of said determining means.

2. The invention set forth in claim 1 wherein said organizing means includes:

means for direecting all said message protocols to the same communications switch address without regard to either the system from which said data have been accepted or the system to which said data are directed.

3. The invention set forth in claim 1 wherein said means for accepting a transported message protocol includes:

means for concurrently accepting transported message protocols from a plurality of different networks.

4. The invention set forth in claim 3 wherein said means for accepting a transported message protocol further includes:

means for maintaining a distinction between respective received ones of said transported message protocols from said plurality of different networks.

5. The invention set forth in claim 4 wherein said means for accepting a transported message protocol further includes:

means for accepting responses from systems to which control data have been communicated;

means for organizing said accepted responses into message protocols for transport on said common communications switch to said telecommunication network from which said control data has been received under control of said distinction maintaining means.

6. In a communication system in which a long distance carrier handles certain telecommunication connections between calling and called telephone end users and wherein a local carrier provides respective physical connections to at least some of the end users, and wherein administrative data pertaining to a particular one of said physical connections are generated at either the long distance carrier or at the local carrier, said administrative data structured in a protocol unique to said generating carrier and generated at a number of different physical locations within said generating carrier's operating boundaries, said system comprising:

means at said generating carrier for gathering at a central point generated administrative data destined for the other carrier;

means at said central point for packaging groups of said gathered administrative data into a transport protocol for communication across a switched telecommunication network to a target carrier;

means at said target carrier for receiving transported ones of packaged groups of administrative data and for processing said transport protocol to reconstruct said administration data into a protocol usable by equipment within said target carrier;

means at said target carrier for maintaining a cross reference between equipment and the physical location of said equipment; and means controlled by said processing means for delivering said reconstructed data to a location within said target carrier in accordance with equipment information embedded within said transport protocol and with said cross reference maintained by said target carrier.

7. The invention set forth in claim 6 further comprising:

means at said generating carrier for identifying a group of said administrative data to be processed as a unit by said target carrier;

means for identifying a communication channel between said generating carrier and said target carrier with a particular one of said units; and means at said target carrier for returning messages pertaining to each said unit over said communication channel identified with said unit.

8. The invention set forth in claim 6 wherein said administrative data comprise a trouble report generated at said long distance carrier identifying a particular end user's equipment and wherein said target carrier is said local carrier;

means at said local carrier for accepting said trouble report and for determining the condition of said end user's equipment; and means controlled by said target carrier processing means and responsive to said determining means for packaging a response into said transport protocol for delivery across said switched network to said long distance carrier.

9. The invention set forth in claim 6 wherein said communication across said switched telecommunication network is between a single point of contact within each said carrier.

10. The invention set forth in claim 6 further comprising:

association means for cooperating between said packaging means at said generating carrier and said receiving means at said target carrier for establishing a linkage therebetween for each said transported protocol;

means at said target carrier for maintaining a data association between each said linkage and the equipment identification received as part of said transported protocol of said linkage; and means controlled by said packaging means at said generating carrier for transporting inquiry messages to said target carrier receiving means on a linkage-by-linkage basis.

11. The invention set forth in claim 10 further comprising:

means controlled by said receiving means at said target carrier for determining when an association should be closed; and means controlled by said receiving means at said target carrier for communicating said determination to said generating carrier.

12. The invention set forth in claim 11 wherein all said transported protocols across said switched telecommunications network occur between a single transmission point at said generating carrier and a single transmission point at said target carrier.

13. The invention set forth in claim 12 further comprising:

means for ending each said association under control of said closure determination means; and means for maintaining a pathway through said swithched telecommunication network between said central points for each said association prior to an ending of said association.

14. The invention set forth in claim 10 further comprising:

means controlled by said receiving means at said target carrier for screening incoming status inquiry messages and for providing responses to said inquiry messages only when the inquiry for a particular linkage matches said stored data pertaining to said linkage for each said linkage.

15. The invention set forth in claim 10 wherein said inquiry message pertains to a trouble history record of said identified equipment.

16. The invention set forth in claim 10 further comprising:

means controlled by said receiving means at said target carrier for verifying that said packaging means at said generating carrier is authorized to transport said inquiry message.

* * * * *